(12) United States Patent
Kim et al.

(10) Patent No.: US 9,337,939 B2
(45) Date of Patent: May 10, 2016

(54) OPTICAL IO INTERCONNECT HAVING A WDM ARCHITECTURE AND CDR CLOCK SHARING RECEIVER

(71) Applicant: Intel Corporation, Santa Clara, CA (US)

(72) Inventors: Inho Kim, Mountain View, CA (US); Zuoguo Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 13/629,945

(22) Filed: Sep. 28, 2012

(65) Prior Publication Data

US 2014/0093245 A1    Apr. 3, 2014

(51) Int. Cl.
| | |
|---|---|
| *H04B 10/69* | (2013.01) |
| *H04J 14/02* | (2006.01) |
| *H04B 10/40* | (2013.01) |
| *H04L 7/00* | (2006.01) |
| *H04L 25/14* | (2006.01) |

(52) U.S. Cl.
CPC ............... *H04B 10/69* (2013.01); *H04B 10/40* (2013.01); *H04J 14/02* (2013.01); *H04L 7/00* (2013.01); *H04L 25/14* (2013.01)

(58) Field of Classification Search
CPC ........ H04B 10/40; H04B 10/60; H04B 10/66; H04B 10/69; H04J 14/02

USPC .............................................. 398/79, 90, 202
See application file for complete search history.

(56) References Cited

U.S. PATENT DOCUMENTS

| | | | |
|---|---|---|---|
| 2003/0030878 A1* | 2/2003 | Jong et al. ...................... 359/189 |
| 2004/0071389 A1* | 4/2004 | Hofmeister et al. ............. 385/16 |
| 2004/0076113 A1* | 4/2004 | Aronson et al. ............... 370/217 |
| 2004/0136711 A1* | 7/2004 | Finan et al. ...................... 398/59 |
| 2006/0126993 A1* | 6/2006 | Piede et al. ...................... 385/14 |
| 2008/0002985 A1* | 1/2008 | Shang et al. ................... 398/141 |
| 2009/0028509 A1* | 1/2009 | Tadakuma et al. ............. 385/122 |
| 2011/0236031 A1* | 9/2011 | Itou ............................... 398/141 |
| 2012/0183250 A1* | 7/2012 | Cheben et al. ..................... 385/2 |

* cited by examiner

*Primary Examiner* — David Payne
*Assistant Examiner* — Casey Kretzer
(74) *Attorney, Agent, or Firm* — Jordan IP Law, LLC

(57) ABSTRACT

Systems and methods may provide for an optical module including an optical demultiplexer to receive a wavelength division multiplexed (WDM) signal from a single receive optical fiber and separate the WDM signal into a plurality of optical signals. Additionally, the optical module may include a receiver conversion unit to convert the plurality of optical signals into a corresponding plurality of electrical signals. In addition, the optical module may include a buffer chip having a single clock and data recovery (CDR) module to recover a clock from a designated signal in the plurality of electrical signals and distribute the recovered clock to a plurality of data lanes corresponding to the plurality of electrical signals.

24 Claims, 3 Drawing Sheets

US 9,337,939 B2

OPTICAL IO INTERCONNECT HAVING A WDM ARCHITECTURE AND CDR CLOCK SHARING RECEIVER

GOVERNMENT INTEREST STATEMENT

This invention was made with Government support under H98230-10-9-0021 awarded by the Department of Defense. The Government has certain rights in this invention.

BACKGROUND

1. Technical Field

Embodiments generally relate to input/output (IO) interconnects. More particularly, embodiments relate to optical IO interconnects having a wavelength division multiplexed (WDM) architecture and clock and data recovery (CDR) clock sharing receiver.

2. Discussion

As input output (IO) interconnect speeds continue to increase in server links such as processor-to-processor, processor-to-memory and peripheral IO connections, link distances may be limited by signal integrity (SI) concerns. Indeed, link distance limitations can be particularly challenging in datacenters and high performance computing (HPC) systems in which large scale IO connectivity is needed between servers, routers and switches.

While optical IO interconnects may alleviate distance constraints to a certain extent, there remains considerable room for improvement. For example, a conventional optical serial link may be based on a parallel architecture carrying N-bit data lanes over N-number of optical fiber strands in each direction, wherein skew between the data lanes of the end-to-end optical link can be considerably large and/or unpredictable due to variations in fiber manufacturing and assembly processes. As a result, each receiver lane may use a clock and data recovery (CDR) module to recover the clock of the lane in question so that data may be correctly latched in the receiver. The use of N-CDR modules in the receiver, however, may lead to increased power consumption, which can be a significant concern in large scale computing architectures such as datacenters and HPC systems.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
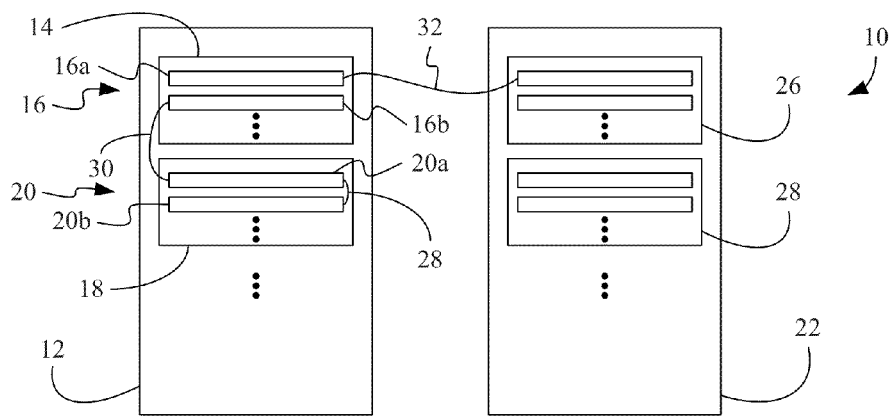
FIG. 1 is a block diagram of a plurality of computing racks according to an embodiment.

Turning now to FIG. 1, a system 10 is shown. In the illustrated example, a first server rack 12 includes a first chassis 14 with a plurality of blades 16 (16a, 16b), wherein each blade 16 may have a computing platform with various components such as processors, IO modules, memory devices, system on chip (SoC) chipsets, and so forth. The first server rack 12 may also include a second chassis 18 having a plurality of blades 20 (20a, 20b), wherein each blade 20 may also include a computing platform. The illustrated system 10 also includes a second server rack 22 having chassis 26, 28, with respective blades, computing platforms, components, etc. The system 10 may therefore be part of a large scale computing architecture capable of functioning as a datacenter, high performance computing (HPC) system, and so forth.

As will be discussed in greater detail, optical input output (IO) interconnects may be used to link the components of the system IO together. In the illustrated example, the blade 20a of the second chassis 18 is connected to the blade 20b of the second chassis 18 via a high speed optical interconnect 28. Additionally, the blade 20a of the second chassis 18 may be connected to the blade 16b of the first chassis 14 via a high speed optical interconnect 30. Moreover, the blade 16a of the first chassis 14 might be connected to a blade of the chassis 26 in the second server rack 22 via a high speed optical interconnect 32. Thus, the use of the optical interconnect 28 inside the chassis 18, the use of the optical interconnect 30 inside the first server rack 12, and the use of the optical interconnect 32 between the first server rack 12 and the second server rack 22 may represent a set of very short reach (VSR) applications that support IO communications inside a chassis (e.g., <1 meter), intra-rack (e.g., <3 meters), and inter-rack (e.g., <10 meters), respectively. The optical interconnects 28, 30, 32 may implement one or more high-speed serial link protocols such as, for example, Intel's cache-coherent protocol QPI (QuickPath Interconnect), PCI-e (Peripheral Components Interconnect Express, e.g., PCI Express x16 Graphics 150W-ATX Specification 1.0, PCI Special Interest Group), Ethernet (e.g., Institute of Electrical and Electronics Engineers/IEEE 802.3-2005), InfiniBand (e.g., InfiniBand™ Architecture Specification Volume 1, Release 1.2.1, November 2007, InfiniBand$^{SM}$ Trade Association), and so forth.

Figure 2:
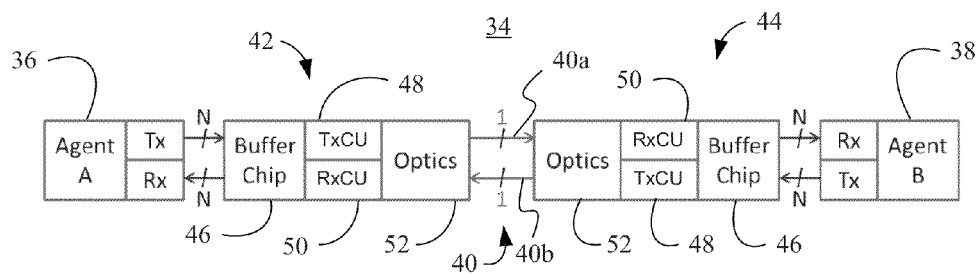
FIG. 2 is a block diagram of an example of an optical link according to an embodiment.

FIG. 2 shows an optical link 34 between a first agent 36 ("Agent A") and a second agent 38 ("Agent B"). The agents 36, 38 may include, for example, processors, system on chip (SoC) chipsets, IO modules, etc., of separate computing platforms. For example, in the case of a large scale computing architecture, the computing platforms might reside within the same rack or on different racks. Thus, the optical link 34 could be readily incorporated into any of the optical interconnects 28, 30, 32 (FIG. 1), already discussed. In general, wavelength division multiplexed (WDM) signals may be transmitted and received in the optical domain, wherein many different wavelength optical channels can be multiplexed into each WDM signal. Thus, rather than using N optical fibers in each direction for N channels, the illustrated optical link 34 uses only a pair of optical fibers 40 (40a, 40b) for both directions.

The first agent 36 uses a first optical module 42 to transmit and receive the WDM signals and the second agent 38 uses a second optical module 44 to transmit and receive the WDM signals, in the illustrated example. In general, each optical module 42, 44 may include a buffer chip 46, a transmitter conversion unit 48, a receiver conversion unit 50, and an optics interface 52. As will be discussed in greater detail, the use of a single optical fiber 40a, 40b in each direction can significantly reduce variability in the effective group index of the optical fibers 40, which can in turn reduce the maximum lane-to-lane skew in the N-bit wide electrical signals to be provided to the agents 36, 38. Moreover, a receiver portion of the buffer chips 46 may use a single clock and data recovery (CDR) module to recover a clock from one of the channels/data-lanes, and distribute the recovered clock to the other data lanes.

Figure 3:
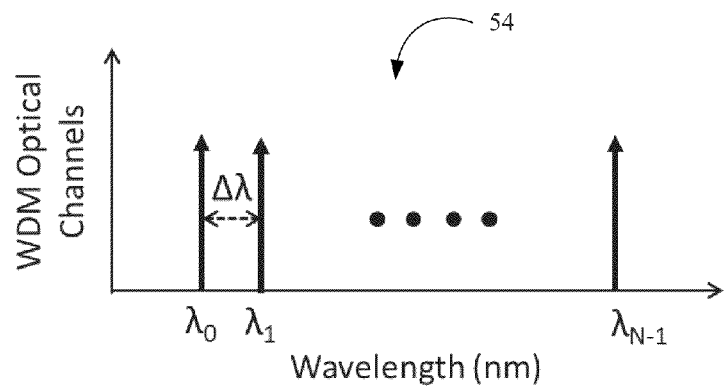
FIG. 3 is a plot of an example of wavelength content in a wavelength division multiplexed (WDM) signal according to an embodiment.

FIG. 3 shows a plot 54 of wavelength content in a WDM signal that may be transmitted across optical fibers such as, for example, the optical fibers 40 (FIG. 2). In the illustrated example, N optical channels (e.g., equivalent to the number of data lanes in a serial link) are multiplexed into a single WDM signal having optical energy at wavelengths $\lambda_0$ to $\lambda_{N-1}$ with a channel spacing of $\Delta\lambda$. Accordingly, the used optical bandwidth is $N*\Delta\lambda$, in the example shown.

Figure 4:
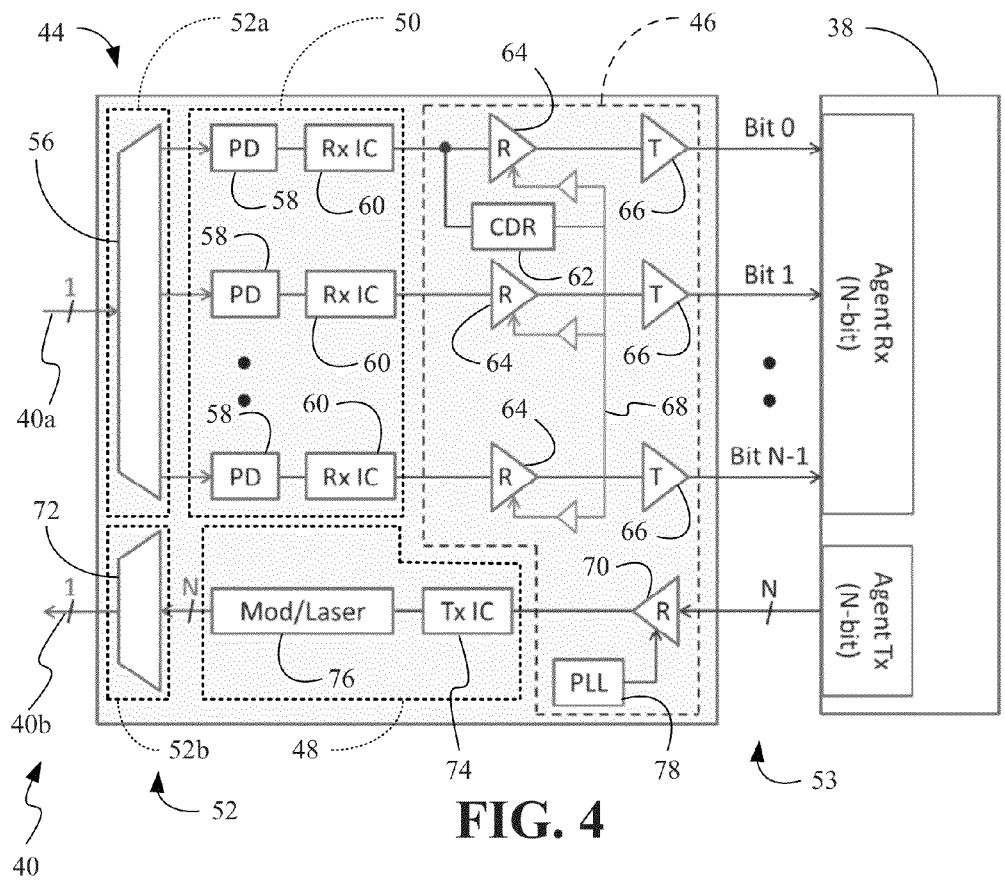
FIG. 4 is a block diagram of an example of an optical module according to an embodiment.

Turning now to FIG. 4, the optical module 44 is shown in greater detail, wherein the illustrated optical module 44 is coupled to the agent 38 via an electrical link 53. The optics interface 52 (52a, 52b) to the optical fibers 40 may generally have a receiver portion 52a and a transmitter portion 52b. In the illustrated example, the receiver portion 52a includes an optical demultiplexer 56 configured to receive a first WDM signal from the receive optical fiber 40a and separate the first WDM signal into a first plurality of optical signals. The first WDM signal may be generated by another optical module such as the optical module 42 (FIG. 2) coupled to the other end of the receive optical fiber 40a. Moreover, the first WDM signal might contain wavelength content such as the content shown in the plot 54 (FIG. 3) with respect to N optical channels. The illustrated receiver conversion unit 50 includes a plurality of photodetectors 58 coupled to the optical demultiplexer 56, as well as a corresponding plurality of receiver integrated circuits (ICs) 60 that may include transimpedance and limiting amplifiers coupled to the plurality of photodetectors 58 and the buffer chip 46. Thus, the receiver conversion unit 50 may convert the first plurality of optical signals into a corresponding first plurality of electrical signals, and provide the first plurality of electrical signals to the buffer chip 46.

Of particular note is that the buffer chip 46 may have a single CDR module 62 to recover a clock from a designated signal in the first plurality of electrical signals and distribute the recovered clock to the plurality of data lanes corresponding to the first plurality of electrical signals. The elimination of the remaining CDRs for the other data lanes can significantly reduce power consumption in the optical module 44. As will be discussed in greater detail, the use of WDM to combine all optical signals on to the single optical fiber 40a can reduce the maximum lane-to-lane skew of the first plurality of electrical signals because the relative effective group index variation over a particular wavelength range may remain almost unchanged in any given single optical fiber such as the optical fiber 40a.

In the illustrated example, each data lane includes a receive buffer 64 coupled to the receiver conversion unit 50 and a transmit buffer 66 coupled to the receive buffer 64, wherein the transmit buffer 66 may transmit a corresponding electrical signal to the agent 38 via the electrical link (e.g., circuit board traces) 53. Additionally, the buffer chip 46 may include a clock distribution buffer arrangement 68 coupled to the output of the CDR module 62 and the plurality of data lanes. The clock distribution buffer arrangement 68 may provide for effective data latching into the receive buffers 64.

The buffer chip 46 may also include another receive buffer 70 to receive a second plurality of electrical signals from the agent 38, and a phase locked loop (PLL) 78 coupled to the receive buffer 70 in order to re-time the incoming data from the agent 38. Accordingly, the optical module 44 may also include a transmitter conversion unit 48 that converts the second plurality of electrical signals into a second plurality of optical signals, wherein the transmitter portion 52b can include an optical multiplexer 72 to combine the second plurality of optical signals and transmit a second WDM signal onto the single transmit optical fiber 40b based on the second plurality of optical signals. In one example, the transmitter conversion unit 48 includes a modulator-driver 74 coupled to the receive buffer 70 and a light source 76 (e.g., modulated laser) to generate the second plurality of optical signals based on the re-timed second plurality of electrical signals. The aforementioned first optical module 42 (FIG. 2) may be constructed similarly to the illustrated second optical module 44.

Assuming that the incoming N-bit lanes from the first agent 36 (FIG. 2) are re-timed by the first optical module 42 (FIG. 2), the maximum lane-to-lane skew ($\Delta T$) of the end-to-end optical link may primarily be determined by the propagation delay difference between N optical channels over the single optical fiber 40a. For a finite fiber distance, the propagation delay (T) of each wavelength channel can be given as follows, $$T(\lambda)=L/c*Neff(\lambda), \tag{1}$$

where L is the optical fiber length, c is the speed of light and Neff($\lambda$) is the effective group index of the optical fiber 40a at wavelength $\lambda$.

Figure 5:
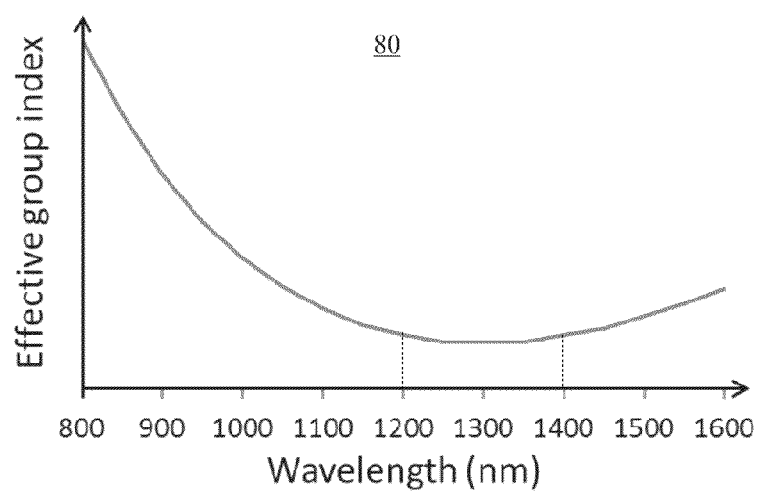
FIG. 5 is a plot of an example of an effective group index curve of optical fiber according to an embodiment.

FIG. 5 shows an effective group index curve for a typical optical fiber (e.g., single-mode or multi-mode). In the illustrated example, at around 1300 nm, the effective group index variation is substantially constant over an approximately 200 nm wavelength range (i.e., 1200 nm to 1400 nm). Accordingly, the maximum skew ($\Delta T$) between N different wavelength optical channels can primarily be a function of the wavelength range of the WDM signal and the length of the optical fiber.

Figure 6:
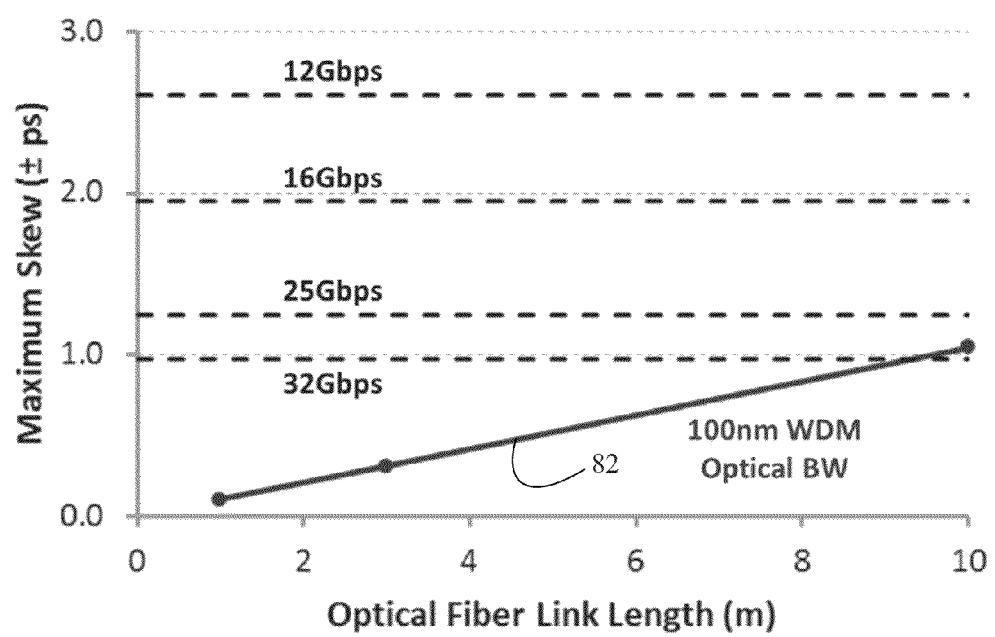
FIG. 6 is a plot of an example of a maximum lane-to-lane skew curve according to an embodiment.

For example, FIG. 6 shows a maximum skew curve 82 for various optical fiber link lengths in an example implementation in which an operating wavelength of 1300±50 nm (i.e., 100 nm optical bandwidth) is selected and the effective group index variation is relatively small. In the illustrated example, the maximum permitted skew between N data lanes at the receiver is ±1/32 UI (unit interval), say ±2.60 ps, ±1.95 ps, ±1.25 ps, and ±0.98 ps at data rates of 12 Gbps, 16 Gbps, 25 Gbps, and 32 Gbps per lane, respectively. The achievable fiber link length would therefore be greater than ten meters at 25 Gbps and approximately nine meters at 32 Gbps. Thus, for shorter than three meter usages (e.g., inside a chassis and intra-rack interconnects), data rates of greater than 32 Gbps may be realized, in the example shown.

Of particular note is that a conventional solution in which N optical fibers are used for N channels, fiber-to-fiber manufacturing variations would lead to substantially higher skew due to much greater variability in the effective group index. Simply put, using a single receive optical fiber and providing the WDM signal with a wavelength range in which the effective group index associated with the optical fiber is substantially constant can facilitate efficient clock recovery by a single CDR module for all channels. The use of a single CDR module in the receiver may provide significant power savings. Moreover, such an approach may result in the electrical signals of the receiver having a maximum skew that is primarily a function of the wavelength range of the WDM signal and the length of the optical fiber. Accordingly, high data rate applications may be implemented in very short reach settings.

Embodiments may therefore include an optical module having an optical demultiplexer to receive a first WDM signal from a single receive optical fiber and separate the first WDM signal into a first plurality of optical signals. The optical module may also have a receiver conversion unit to convert the first plurality of optical signals into a corresponding first plurality of electrical signals. Additionally, the optical module can have a buffer chip with a single CDR module to recover a clock from a designated signal in the first plurality of electrical signals and distribute the recovered clock to a plurality of data lanes corresponding to the first plurality of electrical signals.

Embodiments may also include a method in which a first WDM signal is received from a single receive optical fiber, and the first WDM signal is separated into a first plurality of optical signals. The method can also provide for converting the first plurality of optical signals into a corresponding plurality of electrical signals, and using a single CDR module to recover a clock from a designated signal in the first plurality of electrical signals. In addition, the recovered clock may be distributed to a plurality of data lanes corresponding to the first plurality of electrical signals.

Embodiments may also include a system having a first optical fiber and a first computing system coupled to first end of the first optical fiber, wherein the first computing platform is to transmit a first WDM signal onto the first optical fiber. The system can also have a second computing platform coupled to a second end of the first optical fiber, wherein the second computing platform includes an agent and an optical module. The optical module may include an optical demultiplexer to receive the first WDM signal from the first optical fiber and separate the first WDM signal into a first plurality of optical signals. The optical module can also include a receiver conversion unit to convert the first plurality of optical signals into a corresponding first plurality of electrical signals. Additionally, the optical module may include a buffer chip with a single CDR module to recover a clock from a designated signal in the first plurality of electrical signals and distribute the recovered clock to a plurality of data lanes corresponding to the first plurality of electrical signals.

Techniques described herein may therefore address concerns regarding energy efficiency as well as cable management in HPC systems having massive data flow. Potential usages may include, but are not limited to, high-speed connectivity from a chassis to a top of the rack (TOR) switch, and between TOR switches inside datacenters. Moreover, space and thermal constraints may be alleviated in a wide variety of platforms. Additionally, blade usages (e.g., central processing unit/CPU to general purpose graphics processing unit/GPGPU blade for thermal) and extended memory architectures (e.g., for distance) may also benefit from the techniques described herein.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated. Moreover, any use of the terms "first", "second", etc., does not limit the embodiments discussed to the number of components listed.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A system comprising:
a first optical fiber;
a first computing platform coupled to a first end of the first optical fiber, the first computing platform to transmit a first wavelength division multiplexed (WDM) signal onto the first optical fiber; and
a second computing platform coupled to a second end of the first optical fiber, the second computing platform including an agent and an optical module having,
an optical demultiplexer to receive the first WDM signal from the first optical fiber and separate the first WDM signal into a first plurality of optical signals,
a receiver conversion unit to convert the first plurality of optical signals into a corresponding first plurality of electrical signals, and
a buffer chip having a single clock and data recovery (CDR) module to recover a clock from a designated signal in the first plurality of electrical signals and distribute the recovered clock to a plurality of data lanes corresponding to the first plurality of electrical signals, wherein the data lanes include a receive buffer and a transmit buffer;
wherein the CDR module is coupled in parallel to an output of a receiver integrated circuit of the receiver conversion unit, and the receiver integrated circuit is coupled to an output of a photodetector of the receiver conversion unit;

wherein the buffer chip further includes a clock distribution buffer arrangement coupled to an output of the CDR module and the plurality of data lanes, and wherein the transmit buffer is coupled to the receive buffer to receive an output of the receive buffer and the receive buffer is coupled to the clock distribution buffer arrangement to receive the recovered clock.

2. The system of claim 1, wherein the first WDM signal is to have a wavelength range in which the effective group index associated with the optical fiber is substantially constant.

3. The system of claim 2, wherein the first plurality of electrical signals are to have a maximum lane-to-lane skew that is primarily a function of the wavelength range of the first WDM signal and a length of the first optical fiber.

4. The system of claim 1, wherein the receive buffer is coupled to the receiver conversion unit and the clock distribution buffer, and wherein the transmit buffer is to transmit a corresponding electrical signal to the agent.

5. The system of claim 4, wherein the agent includes one or more of a processor, a system on chip (SoC) chipset and an input output module.

6. The system of claim 1, wherein the receiver conversion unit includes a plurality of photodetectors coupled to the optical demultiplexer, and a corresponding plurality of electrical amplifiers coupled to the plurality of photodetectors and the buffer chip.

7. The system of claim 1, further including a second optical fiber having a first end coupled to the first computing platform and a second end coupled to the second computing platform, and wherein the buffer chip further includes receive buffers, each of the receive buffers to receive a second electrical signal from the agent, and a phase locked loop (PLL) coupled to each of the receive buffers to re-time each of the second electrical signals, the optical module further including:

transmitter conversion units to convert each of the second electrical signals into a second optical signal and an optical multiplexer to combine each of the second optical signals and transmit a second WDM signal onto the second optical fiber based on the second optical signals.

8. The system of claim 7, wherein each of the transmitter conversion units includes:

a modulator-driver coupled to the receive buffer, and a light source to generate an optical signal based on the re-timed second electrical signals.

9. The system of claim 1, wherein the first computing platform includes a first server rack and the second computing platform includes a second server rack.

10. The system of claim 1, wherein the first computing platform includes a first chassis of a server rack and the second computing platform includes a second chassis of the server rack.

11. The system of claim 1, wherein the first computing platform includes a first blade of a server rack chassis and the second computing platform includes a second blade of the server rack chassis.

12. An optical module comprising:

an optical demultiplexer to receive a first wavelength division multiplexed (WDM) signal from a single receive optical fiber and separate the first WDM signal into a first plurality of optical signals;

a receiver conversion unit to convert the first plurality of optical signals into a corresponding first plurality of electrical signals; and a buffer chip having a single clock and data recovery (CDR) module to recover a clock from a designated signal in the first plurality of electrical signals and distribute the recovered clock to a plurality of data lanes corresponding to the first plurality of electrical signals, and a clock distribution buffer arrangement coupled to an output of the CDR module and the plurality of data lanes, wherein the CDR module is coupled in parallel to an output of a receiver integrated circuit of the receiver conversion unit, and the receiver integrated circuit is coupled to an output of a photodetector of the receiver conversion unit;

wherein each data lane includes a receive buffer coupled to the receiver conversion unit and the clock distribution buffer, and a transmit buffer coupled to the receive buffer, and wherein the transmit buffer is to transmit a corresponding electrical signal to an agent.

13. The optical module of claim 12, wherein the first WDM signal is to have a wavelength range in which the effective group index associated with the optical fiber is substantially constant.

14. The optical module of claim 13, wherein the first plurality of electrical signals are to have a maximum lane-to-lane skew that is primarily a function of the wavelength range of the first WDM signal and a length of the optical fiber.

15. The optical module of claim 12, wherein the corresponding electrical signal is to be transmitted to one or more of a processor, a system on chip (SoC) chipset and an input output module.

16. The optical module of claim 12, wherein the receiver conversion unit includes a plurality of photodetectors coupled to the optical demultiplexer, and a corresponding plurality of electrical amplifiers coupled to the plurality of photodetectors and the buffer chip.

17. The optical module of claim 12, wherein the buffer chip further includes second receive buffers, each of the second receive buffers to receive a second electrical signal from the agent, and a phase locked loop (PLL) coupled to each of the second receive buffers to re-time each of the second electrical signals, the optical module further including:

transmitter conversion units to convert each of the second electrical signals into a second optical signal; and an optical multiplexer to combine each of the second optical signals and transmit a second WDM signal onto a second transmit optical fiber based on the second optical signals.

18. The optical module of claim 17, wherein each of the transmitter conversion units includes:

a modulator-driver coupled to the receive buffer, and a light source to generate an optical signal based on the re-timed second electrical signals.

19. A method comprising:

receiving a first wavelength division multiplexed (WDM) signal from a single receive optical fiber;

separating the first WDM signal into a first plurality of optical signals;

converting the first plurality of optical signals into a corresponding plurality of electrical signals;

using a single clock and data recovery (CDR) module, which is coupled in parallel to an output of a receiver integrated circuit of a receiver conversion unit, to recover a clock from a designated signal in the first plurality of electrical signals;

distributing the recovered clock to a plurality of data lanes corresponding to the first plurality of electrical signals, wherein the data lanes include a receive buffer and a transmit buffer; and using a clock distribution buffer arrangement to distribute the recovered clock to the plurality of data lanes, wherein the receive buffer receives an input from one of the plurality of electrical signals and an input from the clock and data recovery module;

wherein the receiver integrated circuit is coupled to an output of a photodetector of the receiver conversion unit.

20. The method of claim 19, wherein the first WDM signal has a wavelength range in which the effective group index associated with the optical fiber is substantially constant.

21. The method of claim 20, wherein the first plurality of electrical signals have a maximum lane-to-lane skew that is primarily a function of the wavelength range of the first WDM signal and a length of the optical fiber.

22. The method of claim 19, further including transmitting the plurality of electrical signals to an agent.

23. The method of claim 22, wherein the plurality of electrical signals are transmitted to one or more of a processor, a system on chip (SoC) chipset and an input output module.

24. The method of claim 19, further including:
receiving a second plurality of electrical signals from an agent;
converting the second plurality of electrical signals into a second plurality of optical signals; and
transmitting a second WDM signal to a single transmit optical fiber based on the second plurality of optical signals.

* * * * *